No. 825,942. PATENTED JULY 17, 1906.
S. P. SMURR & J. F. KAMEN.
WIRE CUTTING MACHINE.
APPLICATION FILED OCT. 23, 1905.

2 SHEETS—SHEET 1.

Witnesses.
Inventors
Samuel P. Smurr
John F. Kamen
By
Atty

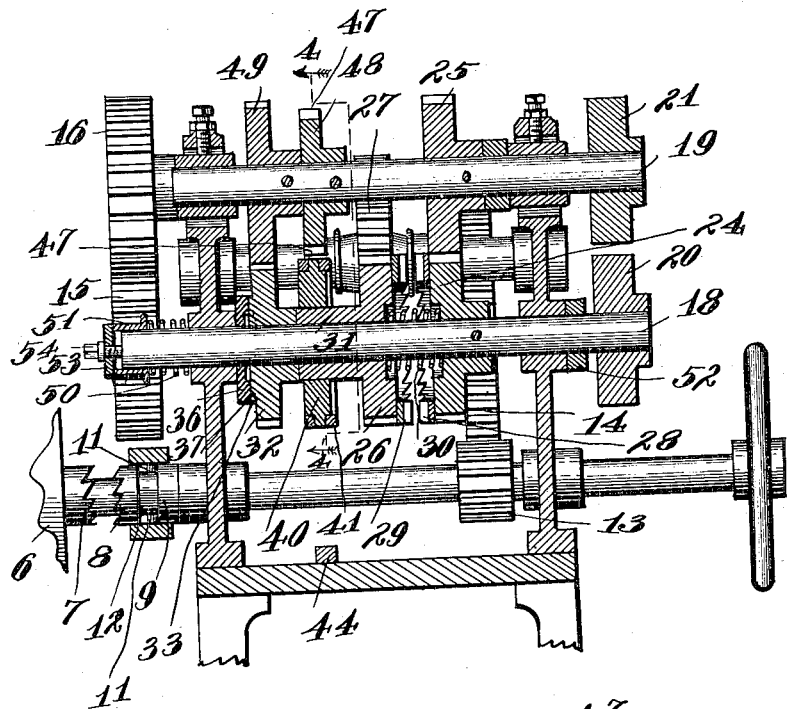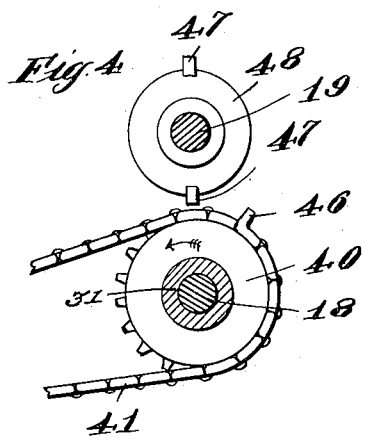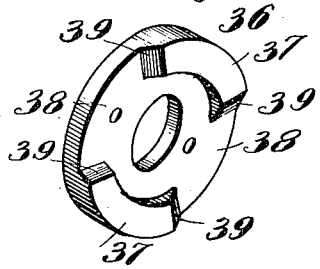

UNITED STATES PATENT OFFICE.

SAMUEL P. SMURR AND JOHN F. KAMEN, OF CHICAGO, ILLINOIS.

WIRE-CUTTING MACHINE.

No. 825,942.  Specification of Letters Patent.  Patented July 17, 1906.

Application filed October 23, 1905. Serial No. 284,012.

*To all whom it may concern:*

Be it known that we, SAMUEL P. SMURR and JOHN F. KAMEN, citizens of the United States, and residents of Chicago, in the county of Cook and State of Illinois, have invented certain new and useful Improvements in Wire-Cutting Machines, of which the following is a specification.

This invention relates to wire-cutting machines, and relates particularly to machines for cutting wire delivered thereto in the form of a continuous strand, as from a coil, into sections or pieces of desired length.

Among the objects of our invention are to provide a machine for this purpose which will be accurate in its operation, cutting the strand of wire into pieces of uniform length, and to provide a machine in which the cutting-wheels are driven directly through the medium of suitable gearing during the cutting operation and which can be quickly and conveniently set or adjusted for cutting pieces of different lengths.

To this end a machine of our invention consists of the various features, combinations of features, and details of construction hereinafter described and claimed.

Our improved wire-cutter is commonly used in connection with other wire-working devices, and in the accompanying drawings we have shown the same in connection with a device for crimping wire to be used in making woven wire, such as is commonly used for making elevated inclosures, partitions, skylight and shaft guards, and for other similar purposes.

Figure 1:
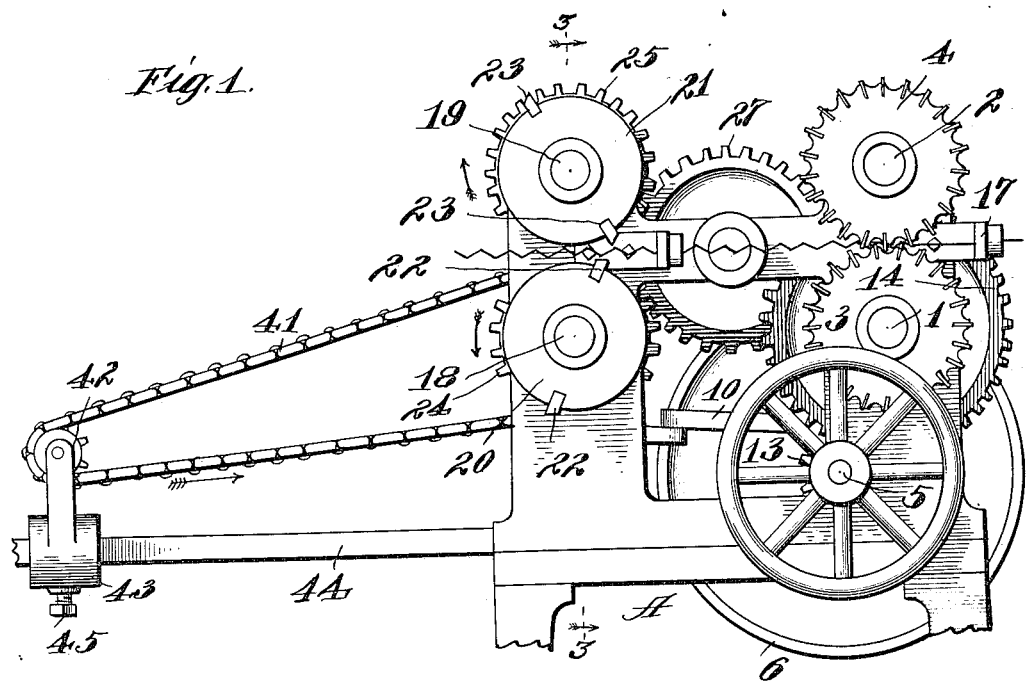
Figure 2:
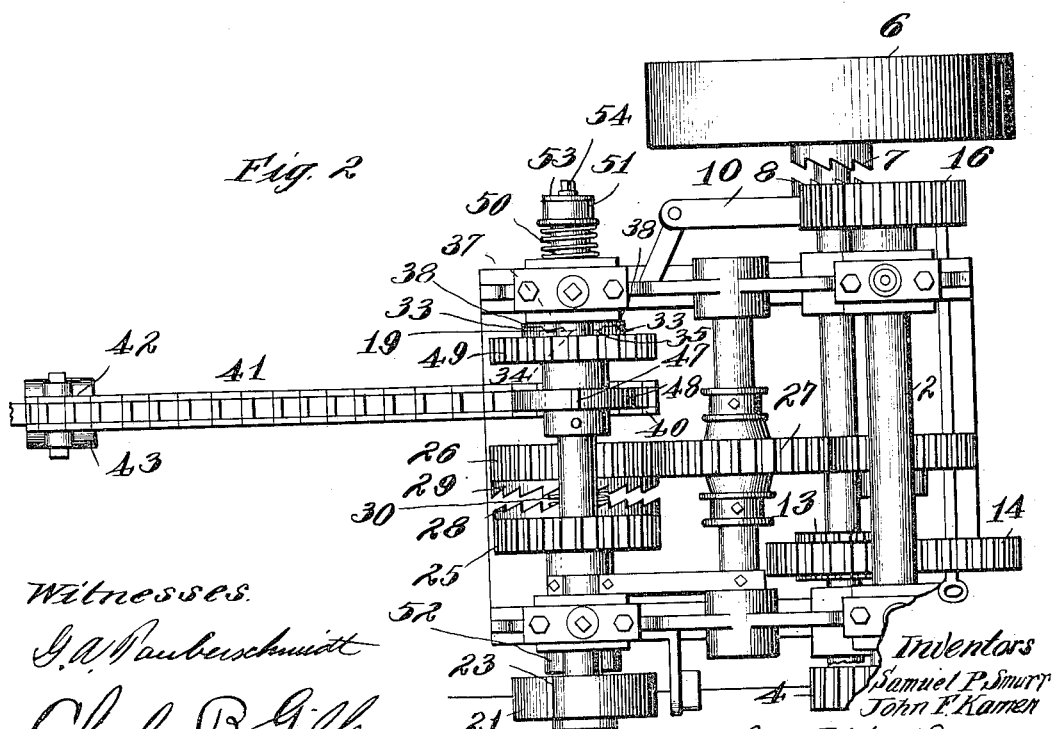

In the drawings, Figure 1 is a side view of a wire-cutter of our invention shown in connection with a wire-crimping machine. Fig. 2 is a top plan view thereof. Fig. 3 is a transverse vertical sectional view on the line 3 3 of Fig. 1. Fig. 4 is a detail sectional view on the line 4 4 of Fig. 3, and Fig. 5 is a detail perspective view of one of the clutch-engaging cam members.

Referring now to the drawings, A designates the frame of the machine, and 1 and 2 shafts revolubly mounted therein, to which the crimping-rolls 3 and 4 are rigidly secured. Rotation is imparted to the crimping-wheel shafts 1 and 2 from a main driving-shaft 5, which is driven from any suitable source of power (not shown) by means of a belt applied to a pulley 6 on said shaft. To provide for stopping the machine quickly, the shaft 5 is driven through the medium of a clutch, comprising clutch-teeth 7 on the hub of the driving-pulley 6 and corresponding clutch-teeth 8 on a sleeve 9, splined to the driving-shaft 5. Engagement and disengagement of the clutch-teeth 8 and 9 are effected by means of a pivoted lever 10, pins 11 secured in which engage a peripheral groove 12 in the collar 9. The crimping-roll shaft 1 is driven directly from the driving-shaft 5 by means of a pinion 13 on the driving-shaft, which engages a gear 14, secured to said crimping-roll shaft. The crimping-roll shaft 2 is driven from the shaft 1 by means of gears 15 and 16 thereon. The wire to be crimped is delivered to the crimping-rolls 3 and 4 through a suitable guide, (indicated at 17,) the crimping-rolls 3 and 4 themselves operating as a feed device to deliver the wire to the machine. All of the foregoing parts are old and well known in the art and are shown merely as illustrating a concrete application of our cutting device, which will now be described.

Revolubly mounted in the machine-frame at a suitable distance from the crimping-roll shafts 1 and 2 are shafts 18 and 19, to which the cutting-wheels 20 and 21 are rigidly secured. As shown, the cutting-wheels 20 and 21 are of the common type, consisting of solid disks with inserted tool-steel cutters 22 and 23, the relation being such that as said wheels 20 and 21 rotate the cutters 22 and 23 in passing each other will operate to shear off the wire passing between said cutting-wheels. The cutting-wheel shafts are maintained in desired relation, and the rotation of either is imparted to the other by means of gears 24 and 25 secured thereto. Intermittent rotation is imparted to the cutter-wheel shafts 18 and 19 by means of a suitable clutch comprising a clutch member rigidly secured to one of said cutter-shafts, as shown to the shaft 18, and a coöperating clutch member mounted to rotate freely on said shaft, which is positively driven by means of suitable connection with the driving-shaft 5 of the machine. As shown, the fixed clutch member consists of the gear 24, and the loose clutch member consists of a gear 26, which is driven directly from the lower crimping-wheel shaft 1 through the medium of an intermediate idle gear 27, mounted on a shaft secured against rotation in suitable bearings in the machine-frame. As shown, said clutch consists of corresponding clutch-teeth 28 and 29 on the adjacent faces of the gears 24 and 26. With the described construction it is obvious that when the clutch-teeth 28 and 29 are in engagement both of the cutter-wheel shafts 18 and 19 will be positively rotated.

The clutch-teeth 28 and 29 are maintained normally disengaged by means of a spring 30, inserted between opposed faces of the gears 24 and 26, and intermittent engagement of said clutch-teeth against the force of the spring 30 is effected by suitable means, as follows: Loosely mounted on the shaft 18, between a hub 31 on the clutch-gear 26 and the bearing for said shaft in the machine-frame, is a gear 32, formed on the side of which adjacent to the shaft-bearing are cam-surfaces comprising corresponding high and low sections 33 and 34, between which are inclined sections 35, and secured to the shaft bearing or housing is a corresponding cam 36, comprising similar high and low sections 37 and 38 and inclined connecting-surfaces 39, the raised sections of the cam on the gear 32 being fitted to the recessed or depressed sections of the cam 36, and vice versa, the relation being such that when the raised sections of the cam on the gear 32 bear upon the raised sections of the cam 36 said gear 32 will force the clutch-gear 26 lengthwise of the shaft 18 to effect engagement of the clutch-teeth 29 on said gear with the clutch-teeth 28 on the gear 24 and such also that when the raised sections of said cams are in engagement with the recessed or depressed sections of the other the clutch-gear 26 will be moved lengthwise of the shaft by the spring 30 a sufficient distance to disengage the clutch-teeth 29 from the clutch-teeth 28. It is also obvious that engagement of the raised sections of each of said cams with the depressed sections of the other will operate to lock the shafts 18 and 19, and thus the cutter-wheels 20 and 21, against rotation and will maintain them in fixed position between intermittent rotary actuations thereof.

As shown, both the cam on the gear 32 and the cam 36 comprise two raised and two recessed sections of equal length arranged alternately, the inclined connecting-surfaces extending substantially at angles of forty-five degrees to the planes of said high and low portions. In other words, each section of said cam forms a quadrant. With this construction it is obvious that disengagement of the raised sections of one cam with the depressed sections of the other and their engagement with the other depressed sections thereof will be effected by one-half of a revolution of the cutter-shafts. This relation is due to the fact that two sets of cutters 22 and 23 are used. If, however, it is desired to use a greater or smaller number of cutters, this can be effected by correspondingly increasing or decreasing the number of raised and depressed sections on said cams. Rotation is imparted to the gear 32 to effect disengagement of the raised sections of said cams with the depressed sections of the other and to bring the raised sections of said cams into engagement with each other, and thus effect engagement of the clutch-teeth 28 and 29 in the following manner: Secured to the sleeve or hub 31 on the gear 26 is a sprocket-wheel 40, to which is adjusted a chain belt 41, which also passes over an idle sprocket 42, revolubly mounted in suitable bearings in a slide 43, supported on a rod or bar 44, so as to be adjustable toward and from the machine and adapted to be secured in any desired adjustment by means of a set-screw 45. With the construction described the sprocket-wheel 40 and chain belt 41 will be driven continuously with the clutch-gear 26 through the medium of the idle gear 27, which puts said gear in train with the gear on the crimping-roll shaft 1, as heretofore described.

Formed on the chain belt 41 is a trip or tappet 46, which is adapted to engage lugs or projections 47 on an escapement-wheel 48, secured to rotate with the shaft 19, and rotation of said shaft 19 by engagement of the trip or tappet 46 with a lug 47 is transmitted to the cam-gear 32 by a gear 49, secured to rotate with the shaft 19 and which meshes with said cam-gear 32, the relation being such that said cam-gear 32 will be rotated in this manner a sufficient distance to move said cam-gear 32 lengthwise of the shaft 18 a sufficient distance to effect engagement of the clutch-teeth 28 and 29. With the described construction it is obvious that as soon as engagement of the clutch-teeth 28 and 29 is effected both shafts 18 and 19 will be positively rotated through one-half of a revolution, or until the raised sections of the cams pass into engagement with the succeeding depressed sections of the other, whereupon the spring 30 will at once operate to disengage said clutch-teeth 28 and 29 and to effect engagement of the raised sections of said cams with the depressed sections of the other, thereby locking both cutter-wheel shafts against rotation until the next engagement of the trip or tappet 46 with a lug or projection 47 on the escapement 48, when the same cycle of operations will be repeated.

The relation and adjustment of the cutters 22 and 23 relatively to the cams which control the clutch-teeth 28 and 29 is such that the cutting operation will not take place until said clutch-teeth are in full engagement, so that at the time the wire is cut said cutter-wheels will be rotating positively by direct driving connection with the crimping-roll shaft 1. In this manner it is obvious that the chain belt 41 will be subjected to no duty other than that required to effect rotation and endwise movement of the cam-gear 32 against the force of the spring 30 to bring the raised sections of the cam thereon into engagement with the raised sections of the cam 36, and thus to throw the clutch-teeth 28 and 29 into engagement.

As shown, the chain belt 41 is provided with but a single trip or tappet 46. Obviously, however, more than one trip or tappet may be provided, if desired. When but a single trip or tappet is used, it is obvious that the lengths of the pieces into which the strand of wire is cut will be exactly equal to the length of the chain belt 41 and that the machine can be quickly and conveniently adjusted to cut pieces of different length by increasing or decreasing the length of the chain belt 41 by inserting or removing a suitable number of links thereof. As the length of the chain belt 41 is increased or decreased the position of the slide 43 will be adjusted to bring the idle sprocket 42 into proper position.

When more than one trip or tappet 46 is used, the lengths of the pieces of wire will be equal to the distances between said trips or tappets.

To allow the shaft 18 to adjust itself to slight lack of uniformity between the inclined sections of the clutch-teeth 28 and 29 and the inclined sections 35 and 39 of the cam on the gear 32 and the cam 36, provision is made for the shaft 18 to yield endwise slightly. As shown, this is effected by means of a spring 50, inserted between the outer side of the shaft-bearing in the frame, and a collar 51, secured to said shaft outside of the frame. Said spring 50 will preferably be slightly stronger than the spring 30 for disengaging the clutch-teeth 28 and 29, and normally said shaft is held against longitudinal movement under the influence of said spring by a collar 52, secured to the opposite end of said shaft and which bears against the outer side of the opposite bearing for said shaft. To provide for adjusting the tension of said spring 50, the sleeve 51 is made to project slightly beyond the end of the shaft 18 and bears against a disk or washer 53, secured in position by means of a screw 54, threaded into the end of the shaft 18. Obviously by screwing up or unscrewing the screw 54 the spring 50 will either be compressed or allowed to expand, thus correspondingly increasing or decreasing the tension thereof in the manner desired.

We claim as our invention—

1. In a wire-cutting machine, the combination of cutters, shafts on which said cutters are secured, means for rotating said cutter-shafts, said means comprising a clutch, means for effecting engagement of said clutch controlled by means comprising a revoluble member, a projection thereon, a driven chain belt, and a trip or tappet thereon adapted to engage the projection on said revoluble member, and means to disengage said clutch.

2. In a wire-cutting machine, the combination of cutters, shafts on which said cutters are secured, a clutch applied to one of said shafts comprising a member loose on said shaft, means for driving said loose clutch member, means for effecting engagement of said clutch controlled by means comprising a revoluble member, a projection thereon, a driven chain belt and a trip or tappet thereon adapted to engage the projection on said revoluble member, and means to disengage said clutch.

3. In a wire-cutting machine, the combination of cutters, shafts on which said cutters are secured, means for rotating said cutter-shafts, said means comprising a clutch, a cam for effecting engagement of said clutch, and means for actuating said cam, said means comprising a revoluble member, a projection thereon, a driven chain belt, and a trip or tappet thereon adapted to engage the projection on said revoluble member, and means to disengage said clutch.

4. In a wire-cutting machine, the combination of cutters, shafts on which said cutters are secured, means for rotating said cutter-shafts, said means comprising a clutch, means for effecting engagement of said clutch, said means comprising a stationary cam member and a movable cam member comprising corresponding raised and depressed sections and intermediate inclined sections, the raised sections of said cam members fitting the depressed sections of the other, means to actuate said movable cam member to effect engagement of the raised sections of said members, said means comprising a revoluble member, a projection thereon, a driven chain belt, a trip or tappet thereon adapted to engage the projection on said revoluble member, and driving connection between said revoluble member and said movable cam member, and a spring adapted to maintain said clutch normally disengaged and the raised sections of said cam members normally in engagement with the depressed sections of the other.

5. In a wire-cutting machine, the combination of cutters, shafts on which said cutters are secured, driving connection between said shafts, a clutch applied to one of said shafts comprising a member mounted to rotate freely thereon, means for driving said loose clutch member, a clutch-engaging cam, comprising a stationary member and a member movable lengthwise of said shaft, driving connections between said movable cam member and the cutter-shaft other than that to which said clutch is applied, a projection on said shaft, a sprocket-wheel secured to rotate with said loose clutch member, a chain belt adjusted to said sprocket-wheel, a trip or tappet on said chain belt adapted to engage said projection on the other shaft, the relation being such that through its driving connection with the movable cam member, rotation of said cutter-shaft by said trip or tappet will move said movable cam member a sufficient distance to effect engagement of the clutch applied to drive the cutter-shafts, and means to disengage said clutch.

6. In a wire-cutting machine, the combination of cutters, shafts on which said cutters are secured, driving connection between said shafts, a clutch applied to one of said shafts comprising a member mounted to rotate freely thereon, means for driving said loose clutch member, a clutch-engaging cam, comprising a stationary member and a member movable lengthwise of said shaft, driving connection between said movable cam member and the cutter-shaft other than that to which said clutch is applied, a projection on said shaft, a sprocket-wheel secured to rotate with said loose clutch member, a chain belt adjusted to said sprocket-wheel, a trip or tappet on said chain belt adapted to engage said projection on the other shaft, the relation being such that through its driving connection with the movable cam member rotation of said cutter-shaft by said trip or tappet will move said movable cam member a sufficient distance to effect engagement of the clutch applied to said cutter-shaft, means to disengage said clutch, and means to lock said cutter-shafts against rotary movement when said clutch is disengaged.

7. In a wire-cutting machine, the combination of cutters, shafts on which said cutters are secured, driving connection between said shafts, a clutch applied to one of said shafts comprising a member mounted to rotate freely on said shaft, means for driving said loose clutch member, a clutch-engaging cam comprising a stationary member and a member movable lengthwise of the shaft to which said clutch is applied, said cam members comprising corresponding raised and depressed sections and intermediate inclined sections, and the relation being such that the raised sections of each of said cams will fit the depressed sections of the other, driving connection between said movable cam member and the cutter-shaft other than that to which said clutch is applied, a projection on said shaft, a sprocket-wheel secured to rotate with said loose clutch member, a chain belt adjusted to said sprocket-wheel, a trip or tappet on said chain belt adapted to engage the projection on the other shaft, the relation being such that through its driving connection with the movable cam member rotation of said cutter-shaft by said trip or tappet will move said movable cam member a sufficient distance to effect engagement of the clutch applied to said cutter-shaft, and a spring inserted between said clutch members adapted to maintain the same normally disengaged and the raised sections of each of said clutch-actuating cam members normally in engagement with the depressed sections of the other.

8. In a wire-cutting machine, the combination of cutters, shafts on which said cutters are secured, means for rotating said cutter-shafts comprising a clutch applied to one of said shafts, positive means for effecting engagement of said clutch, and a spring applied to said shaft to provide for endwise movement thereof under the influence of said clutch-operating means, to compensate for differences between the inclination of the clutch-engaging cam and the clutch-teeth.

In testimony that we claim the foregoing as our invention we affix our signatures, in presence of two subscribing witnesses, this 20th day of October, A. D. 1905.

SAMUEL P. SMURR.
JOHN F. KAMEN.

Witnesses:
CHARLES B. GILLSON,
E. M. KLATCHER.